United States Patent [19]
Shimizu et al.

[11] Patent Number: 5,960,379
[45] Date of Patent: Sep. 28, 1999

[54] METHOD OF AND APPARATUS FOR MEASURING SHAPE

[75] Inventors: Keishi Shimizu; Hidenori Yamada; Kiichi Ueyanagi, all of Nakai-machi, Japan

[73] Assignee: Fuji Xerox Co., Ltd., Tokyo, Japan

[21] Appl. No.: 08/975,647

[22] Filed: Nov. 21, 1997

[30] Foreign Application Priority Data

Nov. 27, 1996 [JP] Japan ................................. 8-332812

[51] Int. Cl.⁶ ........................... G06F 15/20; G01B 11/24
[52] U.S. Cl. ......................... 702/155; 702/166; 356/375; 356/358; 382/154
[58] Field of Search .................... 702/155, 166, 702/167–8; 356/376, 375, 358; 382/154, 203

[56] References Cited

U.S. PATENT DOCUMENTS 5,343,410  8/1994  Tsujiuchi et al. ........................ 382/42

FOREIGN PATENT DOCUMENTS

| | | |
|---|---|---|
| 62-126305 | 6/1987 | Japan . |
| 2-259509 | 10/1990 | Japan . |
| 4-290907 | 10/1992 | Japan . |
| 5-1972 | 1/1993 | Japan . |
| 5-99637 | 4/1993 | Japan . |
| 8-27073 | 1/1996 | Japan . |
| 8-240417 | 9/1996 | Japan . |

OTHER PUBLICATIONS

M. Otsubo, et al., "Measurement of Large Plane Surface Shape with Interferometric Aperture Synthesis", SPIE vol. 1720 (1992). pp. 444–447.

M. Otsubo, et al., "Measurment of large plane surface shapes by connecting small aperture interferogramams", Optical Engineering, vol. 33, No. 2, Feb. (1994), pp. 608–613.

Ogawa et al., "Correction of Aspherical–surface processed shape by Shape measuring device and aspherical surface programming device", O Plus E, No. 155, (Oct. 1992), pp. 86–92.

Gemma, T., "Interferometer for Testing Aspheric Surfaces with Computer–generated Holograms", SPIE Proc., 1332, pp. 1791–1795. No Date.

*Primary Examiner*—Kamini Shah
*Attorney, Agent, or Firm*—Oliff & Berridge, PLC

[57] ABSTRACT

A shape measuring apparatus includes a partial surface measuring device for dividing a surface to be measured having a three-dimensional shape into a plurality of partial regions having mutually overlapped regions and measuring surface shapes of the plurality of partial regions. Movement mechanisms for respectively determining positional attitudes of the partial regions and the partial surface measuring device are also includes, along with a measurement controller for roughly joining measured data on the surface shapes of the partial regions to one another, based on the positional attitudes. Thereafter, fitting of the measured data on the surface shape of the other partial region to the measured data on the surface shape of one partial region in the overlapped regions is performed only in the direction of the substantial normal to the surface of each overlapped region so as to join adjacent the partial regions to one another. The shape measuring apparatus, and corresponding method of use, measures the entire three-dimensional shape of the surface to be measured.

12 Claims, 6 Drawing Sheets

METHOD OF AND APPARATUS FOR MEASURING SHAPE

BACKGROUND OF THE INVENTION

1. Field of the Invention

This invention relates to a method of and an apparatus for measuring a three-dimensional shape of a surface to be measured such as an aspherical lens mounted to a laser printer or the like, which has a complex free-shape surface shape or shape much different from a surface shape of a spherical surface and a length ranging from a few dozen to about 30 mm, with high accuracy of a fraction of a wavelength of a laser.

2. Description of the Related Art

As a method of measuring a three-dimensional shape of a surface to be measured having a free-shape surface shape or shape, one has heretofore been known which repeats dot-coordinate measurements with a tracer or stylus to thereby obtain the whole shape. However, the present method is accompanied by a drawback that the measuring time becomes long and small flaws or the like that exist in the measuring surface, are missed (see e.g., "Correction of Aspherical-surface processed shape by Shape measuring device and Aspherical surface programming device" by Ogawa, et al, O plus E, No. 155, (1992.10), P86).

As a method free of the above drawback, one is known in principle which collectively measures the whole shape of a measuring surface by utilizing a hologram prototype corresponding to a complex free-shape surface shape and an interferometer in combination. It is, however, extremely difficult to manufacture a computer hologram required to measure a large surface extending over a several tens of mm with high accuracy. As a lens mounted to a laser printer, for example, one is known which has a lengthwise size of about 150 mm and a minimum radius of curvature of about 50 mm or below. However, if attention is given to the fact that convergent light must be emitted from a hologram and the lens is placed on an off-access basis to measure a convex surface of such a lens, then a lens size ranging from 200 mm to 250 mm or above, a hologram spatial frequency of 1500 (lines/mm) or above, and a hologram graphics-drawing accuracy of about 1/20 $\mu$m are required. Under the existing circumstances, however, limitations are imposed to a size of about 70 mm and a spatial frequency of about 200 lines/mm upon manufacturing the computer hologram (see, e.g., "Aspherical surface shape measuring interferometer using CGH", by Genma, Precision Engineering Journal, vol. 56, No. 10, (1990), p.1791).

As disclosed in, for example, Japanese Published Unexamined Patent Application No. 62-126305 as a method of solving the above problems, a shape measuring method is known which divides a surface to be measured into a plurality of partial regions measurable by an interferometer and joins measured data on surface shapes of the respective partial regions, which have been measured by the interferometer, to thereby obtain the whole shape of the measuring surface. According to the shape measuring method described in Japanese Published Unexamined Patent Application No. 62-126305, however, since the measuring surface is moved along the optical axis of the interferometer and measured in radial division shape, only the measuring surface having the shapes symmetric with the optical axis thereof could be measured.

As a method of dividing a measuring surface having shapes other axisymmetric shapes into regions to thereby measure a shape, a shape measuring method disclosed in, for example, Japanese Published Unexamined Patent Application No. 04-290907 is known. According to the present shape measuring method, however, the surface to be measured corresponds only to a shape extremely close to the plane.

There is also known a shape measuring method disclosed in Japanese Published Unexamined Patent Application No. 02-259509. According to the present shape measuring method, a surface to be measured is divided into a plurality of partial regions having overlapped regions measurable by an interferometer. Measured data on one surface shape is translated or rotatably moved so that the amount of displacement in measured data on two surface shapes sharing the use of an overlapped region is minimized, to join measured data on surface shapes measured for the respective partial regions to each other by fitting, whereby the whole shape of the surface to be measured is obtained. However, the present shape measuring method has a drawback in that the accuracy of fitting is not sufficiently obtained depending on the shape or size of the overlapped region.

A method proposed by Japanese Patent Application No. 8-27073 filed by the present inventors is known to make up for the above drawback. Japanese Patent Application No. 8-27073 is originally intended for cross-sectional shapes. However, since the present method can be applied to three-dimensional shape instrumentation using an interferometer as described in its embodiment, the method applied to the three-dimensional shape instrumentation will be explained herein. This method is one wherein the amount of displacement or movement required to join respective partial regions to each other is considered to be divided into XYZ axial directions and six components extending in the direction of rotation with respective axes as the centers, the accuracy of fitting using each overlapped region is compared with the accuracy of each of stages for determining positional attitudes of the interferometer and the respective partial regions every six components, and measured data on surface shapes measured for the respective partial regions are joined to one another using values each having better accuracy. Thus, this method has also such drawbacks as will be described below. Although the accuracy has been improved, the required accuracy has not yet been achieved.

Since the hologram prototype is insufficient in accuracy as has already been described, freedom of way is virtually limited to using the spherical or plane prototype to realize the measurement of high accuracy by the interferometer. However, when the complex free-shape surface shape or shape is measured using the spherical or plane prototype, a range measurable at a time becomes extremely small. A range measurable by the plane prototype is considered to be about 2 mm×2 mm at most, for example. Therefore, the regions that overlap among the respective partial regions, become small and the accuracy is not sufficiently obtained in the case of the fitting using the conventional overlapped regions.

It is essential that the stages for respectively determining the positional attitudes of the interferometer and the respective partial regions include the rotatable axis as well as the translational axis to measure the complex free-shape surface shape. The accuracy of the stage including the rotatable axis has its limitation because an Abbe's error corresponding to the primary error due to inability to measure the length by the same axis is produced in proportion to the maximum length of an object to be measured.

Thus, even if the method proposed by Japanese Patent Application No. 8-27073 is used, a problem arose in that the measured data on the surface shapes measured for the respective partial regions could not be eventually joined to one another with high accuracy.

SUMMARY OF THE INVENTION

With the foregoing problems in view, it is therefore an object of the present invention to provide a shape measuring method capable of measuring small partial regions by an interferometer using a spherical or plane prototype and performing high-accuracy fitting from narrow overlap regions even if a surface to be measured has a shape much different from a spherical surface and an apparatus therefor.

It is another object of the present invention to provide a shape measuring method of dividing a complex free-shape surface shape into a plurality of partial regions measurable by an interferometer and joining measured data on surface shapes measured for the respective partial regions to one another, thereby making it possible to obtain the whole shape with high accuracy and an apparatus therefor.

According to one aspect of the invention, for achieving the above objects, there is provided a method of measuring shapes, comprising the steps of:

dividing a surface to be measured having a three-dimensional shape into a plurality of partial regions having mutually overlapped regions;

measuring surface shapes and relative positional attitudes of the plurality of partial regions;

roughly joining measured data on the surface shapes of the plurality of partial regions to one another, based on the relative positional attitudes;

fitting the measured data on the surface shape of the other partial region to the measured data on the surface shape of one partial region in the overlapped regions only in the direction of the normal to the surface of each overlapped region; and joining adjacent partial regions to one another to thereby measure the entire three-dimensional shape of the surface to be measured.

According to another aspect of the invention, for achieving the above objects, there is provided a method of measuring shapes, comprising the steps of:

dividing a surface to be measured having a three-dimensional shape into a plurality of partial regions having mutually overlapped regions;

measuring surface shapes and relative positional attitudes of the plurality of partial regions;

roughly joining measured data on the surface shapes of the plurality of partial regions to each other, based on the relative positional attitudes;

fitting the measured data on the surface shape of the other partial region to the measured data on the surface shape of one partial region in the overlapped regions in a normal average direction indicative of the average of normal directions of the plurality of partial regions on the surface to be measured; and joining adjacent the partial regions to one another to thereby measure entire three-dimensional shape of the surface to be measured.

According to a further aspect of the invention, for achieving the above objects, there is provided a shape measuring apparatus comprising:

partial surface measuring means for dividing a surface to be measured having a three-dimensional shape into a plurality of partial regions having mutually overlapped regions and measuring surface shapes of the plurality of partial regions;

moving means for respectively determining positional attitudes of the partial regions and the partial surface measuring means; and measurement control means for roughly joining measured data on the surface shapes of the partial regions to one another, based on the positional attitudes, and thereafter fitting the measured data on the surface shape of the other partial region to the measured data on the surface shape of one partial region in the overlapped regions only in the direction of the substantial normal to the surface of each overlapped region so as to join adjacent partial regions to one another to thereby measure the entire three-dimensional shape of the surface to be measured.

According to a still further aspect of the present invention, there is provided a shape measuring apparatus comprising:

partial surface measuring means for dividing a surface to be measured having a three-dimensional shape into a plurality of partial regions having mutually overlapped regions and measuring surface shapes of the plurality of partial regions;

moving means for respectively determining positional attitudes of the partial regions and the partial surface measuring means; and measurement control means for roughly joining measured data on the surface shapes of the partial regions to one another, based on the positional attitudes, and thereafter fitting the measured data on the surface shape of the other partial region to the measured data on the surface shape of one partial region in the overlapped regions only in the direction of the substantial normal to surface of each overlapped region so as to join adjacent the partial regions to one another to thereby measure the entire three-dimensional shape of the surface to be measured.

The measurement control means may fit the measured data on the surface shape of the other partial region to the measured data on the surface shape of one partial region in the overlapped regions in a normal average direction indicative of the average of normal directions of the plurality of partial regions on the surface to be measured, so as to join adjacent the partial regions to one another to thereby measure the entire three-dimensional shape of the surface to be measured.

The moving means are respectively movable and rotatable in at least translational two directions orthogonal to each other and one direction of rotation. The partial surface measuring means is a surface measuring device having a measurement accuracy higher than a positioning accuracy of each moving means. The partial surface measuring means is a surface measuring device using optical interference. When the surface to be measured is measured by using a multiaxial stage, the measuring surface may be set so as to allow a normal average direction of the measuring surface to substantially coincide with a translational direction of each axis of the multiaxial stage or the direction normal to the translational direction with a view toward providing a simple high-accuracy measurement.

According to the present invention, even if a surface to be measured has a shape much different from that of a spherical surface, for example, high-accuracy fitting can be done by using a narrow overlapped region shaped between small partial regions measurable by an interferometer using a spherical or plane prototype. Accordingly, the whole shape can be obtained with high accuracy by dividing a complex free-shape surface into a plurality of partial regions measurable by the interferometer and joining measured data on surface shapes measured for the respective partial regions to each other.

Typical ones of various inventions of the present application have been shown in brief. However, the various inventions of the present application and specific configurations of these inventions will be understood from the following description.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

Preferred embodiments of the present invention will hereinafter be described in detail with reference to the accompanying drawings.

Figure 1:
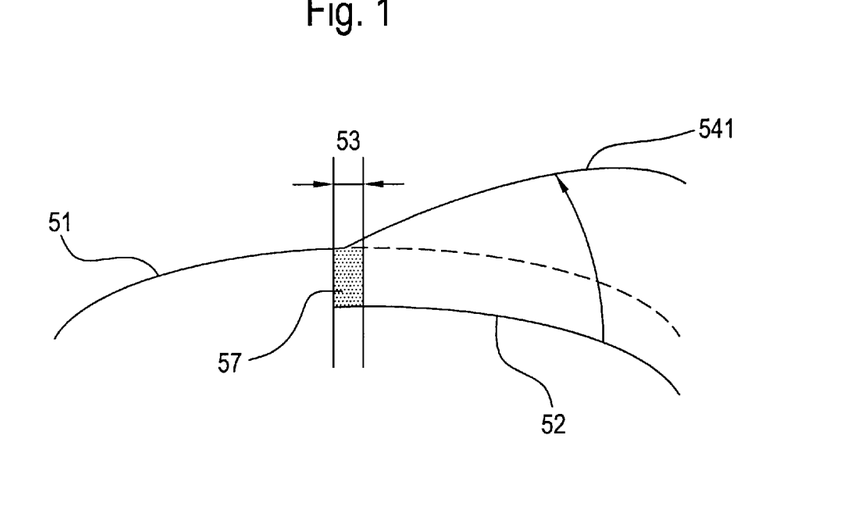
FIG. 1 is a cross-sectional view showing adjacent two partial regions at the time that fitting is made even to an inclined angle to describe a shape measuring method according to a first embodiment of the present invention.
Figure 2:
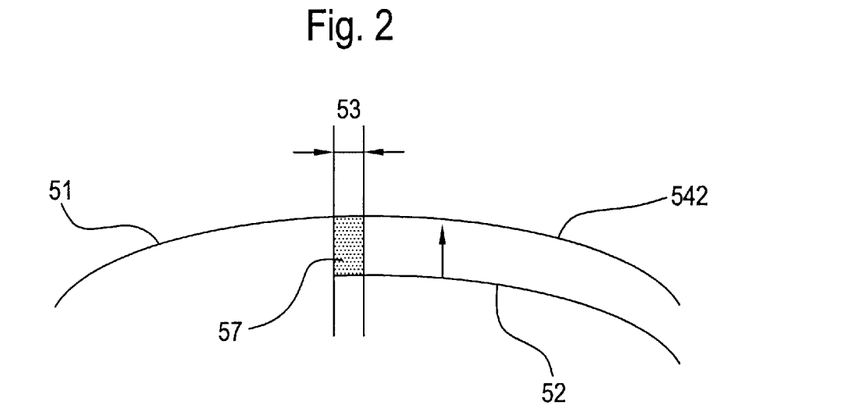
FIG. 2 is a cross-sectional view illustrating the adjacent two partial regions at the time that fitting is made only in the normal direction to describe the shape measuring method according to the first embodiment of the present invention.

A method of and an apparatus for measuring a shape or form, according to a first embodiment of the present invention will be explained with reference to FIGS. 1 through 8. The principle of the shape measuring method according to the present embodiment will first be described with reference to FIGS. 1 and 2. FIGS. 1 and 2 show a cross section of a surface to be measured. A convergence of a fitting calculation in an overlapped region is determined based on the amount of a shift or displacement 57 of an overlapped region 53 between measured data 51 and 52 about adjacent two partial surface shapes. Since the conventional fitting using the overlapped region is made to a plurality of directional components simultaneously, the fitting is reduced in accuracy when the overlapped region 53 is small, thus resulting in the fitting calculation like measured surface-shape data 541. This is because since the amount of displacement 57 itself of the overlapped region is not so changed when the overlapped region 53 is small even if directional components of rotation, i.e., an inclined angle slightly changes, an error is apt to occur in a convergence decision made to the fitting calculation.

Therefore, the shape measuring method according to the present embodiment pays attention to the fact that the direction of sensitivity highest to the amount of displacement 57 of the overlapped region is the normal direction. In other words, the fitting is made only in this direction so as to allow the accuracy of fitting to reach the highest degree as in the case of measured surface-shape data 542 shown in FIG. 2. Namely, the present fitting is different from the conventional fitting. Further, the value of the inclined angle relies on the accuracy of a stage and adopts data on the position of the stage, and hence no fitting is performed on the inclined angle.

The form measuring method according to the present embodiment will hereinafter be described in detail. Now consider an xyz local rectangular coordinate system in which the center of the overlapped region is defined as the point of origin and the normal direction is defined as z. When the shape of one partial surface in the overlapped region is expressed as z=f(x, y), z=f(x, y) is shifted by a six-degree-of-freedom micro displacement so as to overlap with measured data on another partial surface shape best. Thus, the shape in the overlapped region is expressed by the following equation by allowing a high-order micro displacement to approximate zero through a coordinate transforming equation:

$$z = f(x, y) + (\partial f/\partial x)\delta x + (\partial f/\partial y)\delta y - \delta z + \qquad (1)$$
$$(y + f(\partial f/\partial y))\delta a + (x + f(\partial f/\partial x))\delta b +$$
$$(y(\partial f/\partial x) - x(\partial f/\partial y))\delta c$$

where $\delta x$ indicates a displacement or movement in an x direction, $\delta y$ indicates a displacement or movement in a y direction, $\delta z$ indicates a displacement or movement in a z direction, $\delta a$ indicates the amount of rotational movement or motion with the x axis as the center, $\delta b$ indicates the amount of rotational motion with the y axis as the center, and $\delta c$ indicates the amount of rotational motion with the z axis as the center.

The fitting calculation eventually results in the representation of the amount of displacement in the overlapped region as the amount of displacement at sampling points of the two partial surfaces and the determination of respective displacements or movements indicative of unknown quantities in the equation (1) so as to overlap with each other best.

A means for performing the fitting calculation may use various optimizing methods such as the least square, a simplex method, etc.

Meanwhile, the sensitivity of each movement to the amount of displacement in the overlapped region results in the absolute value of a coefficient of each movement approximately expressed in the equation (1). However, since the overlapped region is small and the shape of each partial surface in the overlapped region is smooth, the slopes or inclinations ($\delta f/\delta x$) and ($\delta f/\delta y$) in the x and y directions each corresponding to the tangential direction in the overlapped region substantially become zero. Thus, since the sensitivity of each of $\delta x$, $\delta y$ and $\delta c$ is substantially zero when the overlapped region is small, their displacements or movements cannot be determined by the fitting calculation.

The sensitivity of the displacements or movements $\delta a$ and $\delta b$ in the direction of rotation will be examined. When the length between the center of the overlapped region and its end is short as is about 0.1 mm, for example, the amount of rotational movement of 1arcs is calculated by fitting, followed by conversion into the amount of displacement in the z direction in the overlapped region on the basis of the equation (1). As a result, the amount of displacement is merely 0.5 nm at most even at the maximum and 0.25 nm on the average. Even if a high-accuracy interferometer is used as a partial surface measuring means, such values would be covered with measurement errors of the interferometer itself. On the other hand, the accuracy of a rotatable stage can be achieved to about 0.2 arcs by using the commercially available top-grade rotary encoder (such as RON905 produced by HEIDENHAIN Co., Ltd). Thus, when the overlapped region is small, the sensitivity of the movement in the direction of rotation, which can be calculated by fitting, becomes lower than the accuracy of angular reading by the rotary encoder commercially available at present.

On the other hand, the sensitivity of the movement $\delta z$ in the normal direction is as follows: The absolute value of a coefficient of the movement $\delta z$ is always 1 and constant without regard to the magnitude or size of the overlapped region. Thus, when the accuracy of the partial surface measuring means is higher than the accuracy of the stage, the accuracy of $\delta z$ is improved by performing the fitting calculation.

Thus, when the overlapped region is small, the unknown quantity calculable in accordance with the equation (1) is substantially only the movement $\delta z$ in the normal direction. Even if other movements are forcedly determined by the fitting calculation, a result superior to the accuracy of the stage is not obtained. Reversely, errors contained in the calculated other movements exert a bad influence even on the calculation of each movement in the normal direction, thus increasing a calculational error in the movement in the normal direction. When, on the other hand, only the movement in the normal direction is determined by the fitting calculation, the influence of errors produced by simultaneously calculating other movements is avoided. As a result, the accuracy of calculating each displacement or movement in the normal direction can be improved.

According to the shape measuring method showing the present embodiment, even if the surface to be measured has a shape much different from that of a spherical surface, high-accuracy fitting can be performed using a narrow overlapped region developed in small partial regions capable of being measured by an interferometer using the spherical or plane prototype. Accordingly, the whole shape can be obtained with high accuracy by dividing a complex free-shape surface into a plurality of partial regions measurable by the interferometer and joining measured data on surface shapes measured for the respective partial regions to each other.

Figure 3:
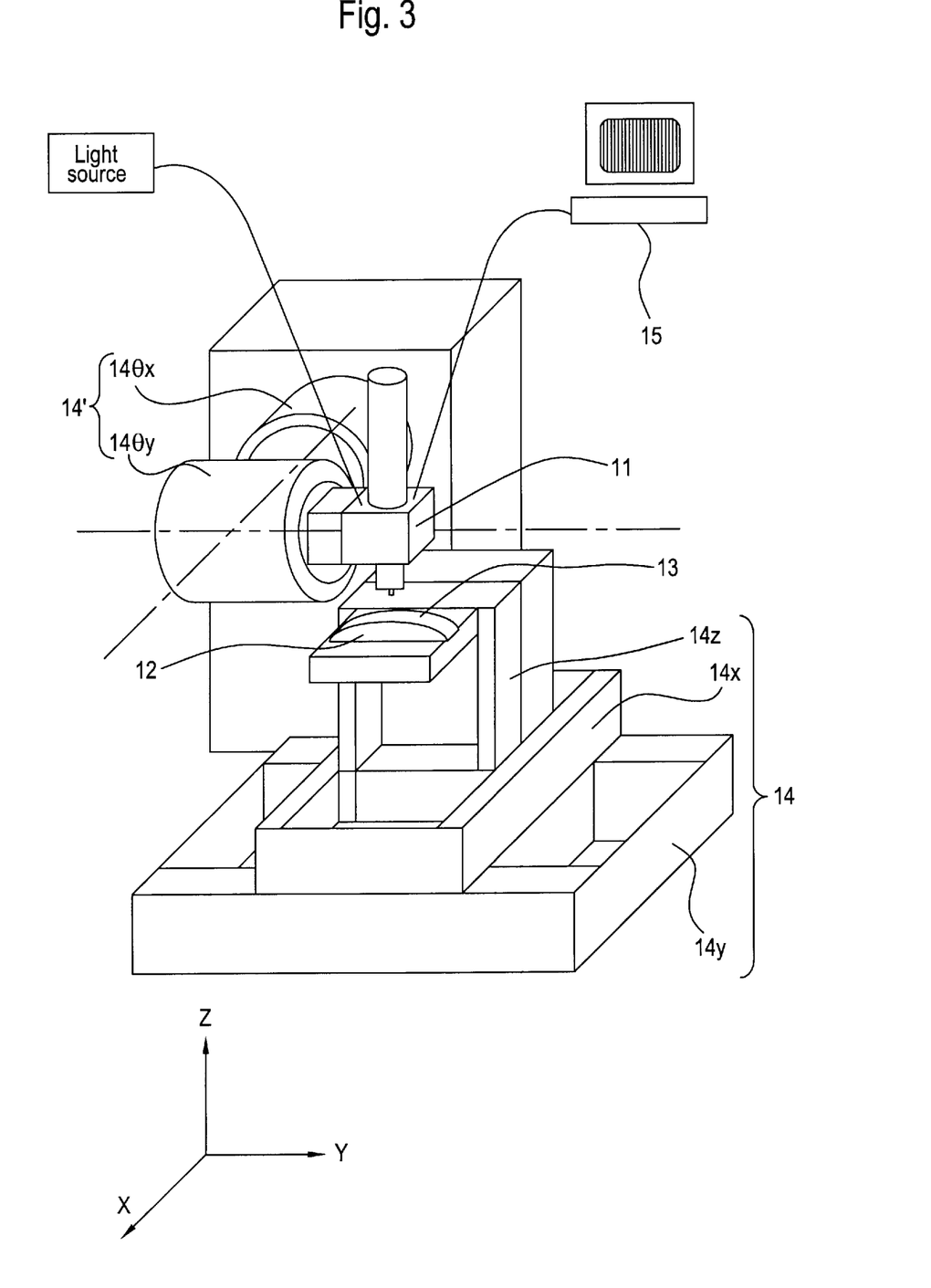
FIG. 3 is a view schematically depicting the structure of an apparatus used for the shape measuring method according to the first embodiment of the present invention.

The shape measuring method according to the present embodiment and the apparatus therefor will next be explained specifically with reference to FIGS. 3 and 4. FIG. 3 schematically shows the structure of the shape measuring apparatus employed in the present embodiment. The present shape measuring apparatus has a directly-advanced stage 14 movable in XYZ translational three directions comprising an X-axis stage 14x movable in an X-axis direction, a Y-axis stage 14y movable in a Y-axis direction and a Z-axis stage 14z movable in a Z-axis direction, and a rotatable stage 14' comprising a $\theta a$ stage 14$\theta$x rotatable with the X axis as the center and a $\theta b$ stage 14$\theta$y provided on the axis of the $\theta a$ stage 14$\theta$x and rotatable with the Y axis as the center.

A white interferometer 11 using a plane prototype as a partial surface measuring means is attached to a rotatable shaft of the $\theta b$ stage 14$\theta$y. The white interferometer 11 has a feature that the absolute distance between a surface to be measured and the interferometer can be determined (see 120/SPIE Vol. 1720(1992), for example). On the other hand, an object 12 to be measured corresponding to an aspherical lens is placed on the Z-axis stage 14z of the directly-advanced stage 14 and positioned so that a measuring surface 13 having a complex aspherical shape be opposed to the white interferometer 11.

Positional attitudes of the white interferometer 11 and the measuring surface 13 are determined by the directly-advanced stage 14 and the rotatable stage 14'. The directly-advanced stage 14 moves the aspherical lens 12 in the translational three directions of the XYZ axes so as to allow the optical axis of the white interferometer 11 to substantially coincide with the normal direction of the measuring surface 13 corresponding to a free-shape surface. The rotatable stage 14' rotates the white interferometer 11 with the X and Y axes as the centers so as to control the orientation of the white interferometer 11.

A control device 15 is used for controlling the directly-advanced stage 14, the rotatable stage 14' and the white interferometer 11 and joining results of measurements made on respective partial regions of the measuring surface 13 to each other to thereby calculate the entire shape.

Figure 4:
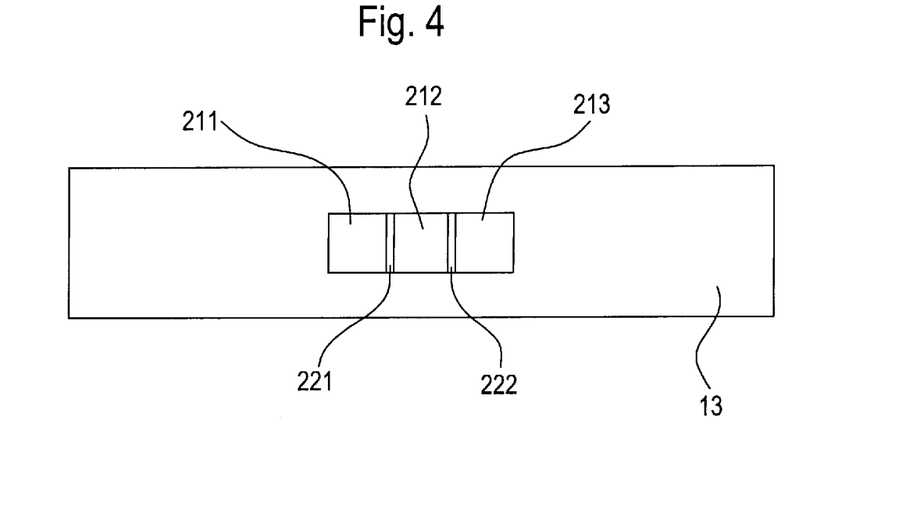
FIG. 4 is a view showing a state in which a surface 113 to be measured placed on a Z-axis stage 14z is observed from the white interferometer 11 side and the measuring surface 13 is divided into a plurality of partial regions by using the shape measuring method according to the first embodiment of the present invention.

FIG. 4 is a view showing the measuring surface 13 of the aspherical lens 12 placed on the Z-axis stage 14z as seen from the white interferometer 11 side and shows a state in which the surface 13 to be measured has been divided into a plurality of partial regions. Partial regions 211, 212 and 213 capable of being measured by the white interferometer 11 and overlapped regions 221 and 222 developed or shaped between the respective partial regions are shown in FIG. 4. In the surface 13 to be measured, its entire surface is actually covered with the partial regions measurable by the white interferometer 11 but omitted in FIG. 4. A representative portion is illustrated in FIG. 4.

Figure 5:
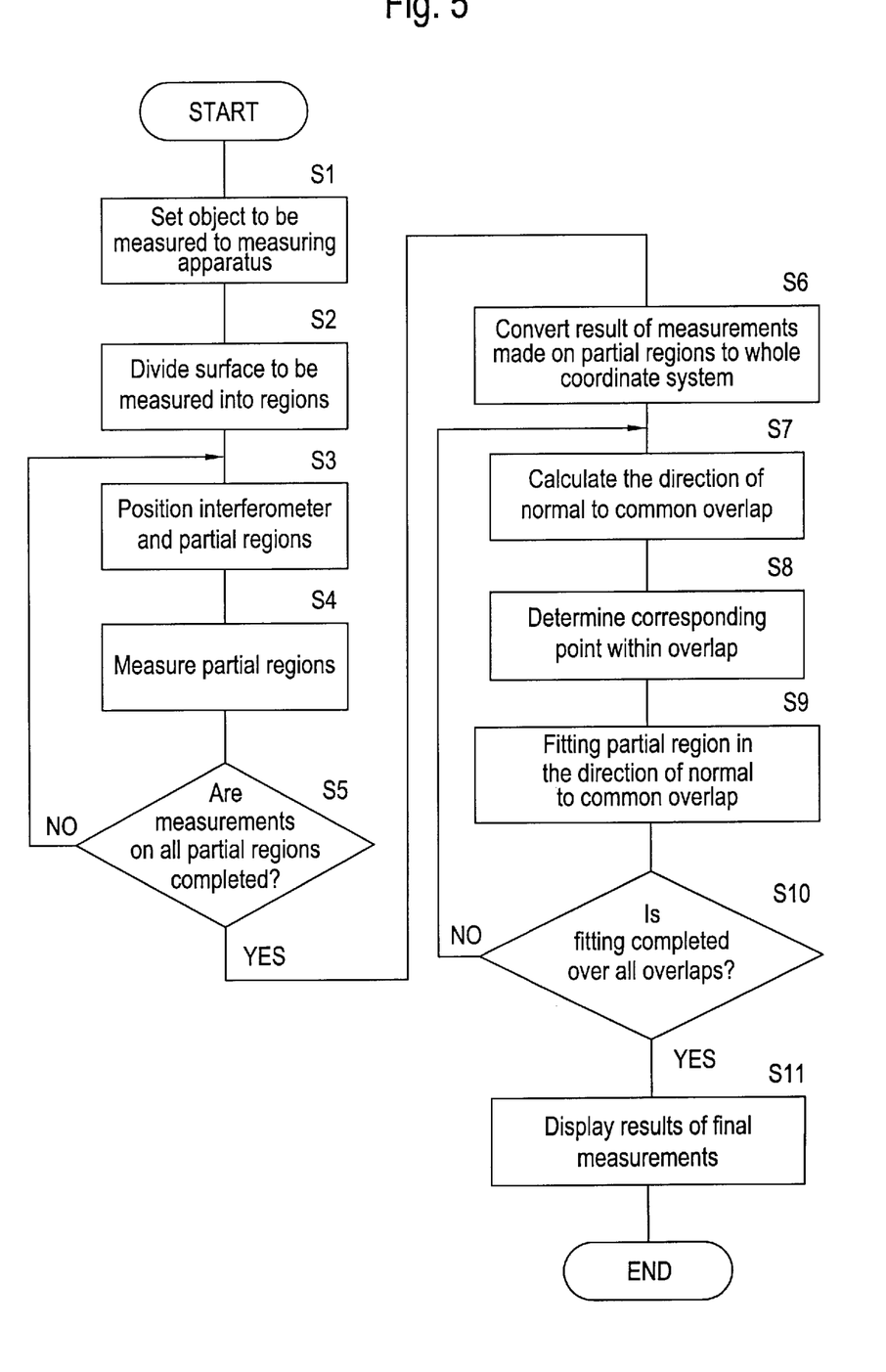
FIG. 5 is a flowchart for describing the shape measuring method according to the first embodiment of the present invention.

The flow of the shape measuring method according to the present embodiment will be explained using a flowchart shown in FIG. 5. The object 12 to be measured is first set on the Z-axis stage 14z of the shape measuring apparatus shown in FIG. 3 (Step S1). Next, the surface 13 to be measured is divided into partial regions capable of being measured by the white interferometer 11 and provided so as to include regions that overlap each other (Step S2). The directly-advanced stage 14 and the rotatable stage 14' are moved and rotated to determine positional attitudes of the white interferometer 11 and the partial region 211 so that the partial region 211 to be first measured can be measured by the white interferometer 11 (Step S3). In this state, a surface shape of the partial region 211 is measured by the white interferometer 11, and shape data on the surface shape of the partial region 211 and data on the positional attitude of the white interferometer 11 at that time are recorded (Step S4). Next, the shape measuring apparatus determines whether or not measurements on all the partial regions to be measured have been completed (Step S5). If partial regions to be measured are left behind, then the shape measuring apparatus returns to Step S3 where the directly-advanced stage 14 and the rotatable stage 14' are moved and rotated to determine positional attitudes of the white interferometer 11 and the partial region 212 so that the partial region 212 adjacent to the partial region 211 can be measured by the white interferometer 11. Subsequently, the same measurements as described above are repeated (Steps S3 to S5).

After the above-described measurements on all the partial regions on the surface 13 to be measured have been completed, the entire shape of the surface 13 to be measured is calculated in accordance with the following method. First of all, measured data on the surface shapes of all the partial regions are converted into a whole coordinate system corresponding to a common coordinate system, based on the positional attitude data on the white interferometer 11 and the partial regions, which are obtained by an encoder or a length measuring machine or the like attached to the stage. Thus, the measured data on the surface shapes of the respective partial regions are roughly joined to each other (Step S6). Next, attention is given to the partial regions 211 and 212 adjacent to each other and the direction of the normal to the surface of the overlapped region 221 commonly provided or shared between the two partial regions is calculated from attitude or position (angular) information obtained when the partial region 211 and 212 are measured (Step S7). A point where a straight line drawn in the direction of the normal to the surface of the overlapped region 221 from each of a plurality of points on the partial region 212 measured by the white interferometer 11 intersects the partial region 211, is then determined by interpolation from a point on the partial region 211 measured by the white interferometer 11, whereby a point where the partial region 211 corresponds to the partial region 212, is determined (Step S8). Fitting is performed on the partial region 212 only in the direction of the normal to the surface of the overlapped region 212 so that the distances between the partial region 212 and all corresponding points of the partial region 211 are minimized as the whole of the overlapped region 221 to thereby correct information on the position of the partial region 212 (Step S9). This calculation is performed on all the adjacent partial regions (Step S10) to obtain data on the entire shape of the surface 13 to be measured (Step S11).

The accuracy obtained by the shape measuring method according to the present embodiment will be explained by simulation in accordance with the following procedure. First of all, three-dimensional shape data on a surface to be measured is created by a computer at sampling intervals measurable by the white interferometer 11 on the basis of a measuring surface design expression, and a normal distribution error equivalent to the accuracy of measurement by the interferometer is added to each point. Attention is next given to a point largest in curvature in the entire surface to be measured. Further, the magnitude or size of the noted point, which is measurable by the white interferometer 11 at a time, is determined and defined as the magnitude or size of the corresponding partial region. The created three-dimensional shape data about the entire surface to be measured is divided into a plurality of partial regions so as to have an overlapped region representative of 20% of the determined magnitude of partial region. Further, a normal distribution error equivalent to the positioning accuracy of the directly-advanced/rotatable stage is added to each point for each shape data on the partial region. Next, a fitting calculation is done in the direction of the normal to the overlapped region shared between measured data on surface shapes of the adjacent partial regions on the basis of measured data on a surface shape of a partial region located in the center of the measuring surface. Thereafter, the position of each measured data on the surface shape is corrected based on the result of calculation. The accuracy of measurement is calculated by performing a comparison between the data about the whole shape in which the positions or locations of all the partial regions have been corrected in order by fitting and a design expression for the measuring surface.

In the above-described simulation, the least square was used for the fitting calculation. Further, the shape of the surface to be measured was set to a rectangle having a length of 160 mm and a width of 10 mm as seen from above and was shaped in a toric shape having radii of curvature of 150 mm and 30 mm. Further, the magnitude or size of the partial region was set to a 1.4 mm×1.0 mm rectangle as seen above the surface shape to be measured. The accuracy of the white interferometer was set to 0.04 μm and the sampling interval was set to 0.1 mm. The translational positioning accuracy determined by the directly-advanced stage 14 and rotatable stage 14' was represented as 0.3 μm and the accuracy of positioning in the direction of rotation was represented as 0.3 arcs.

Figure 6:
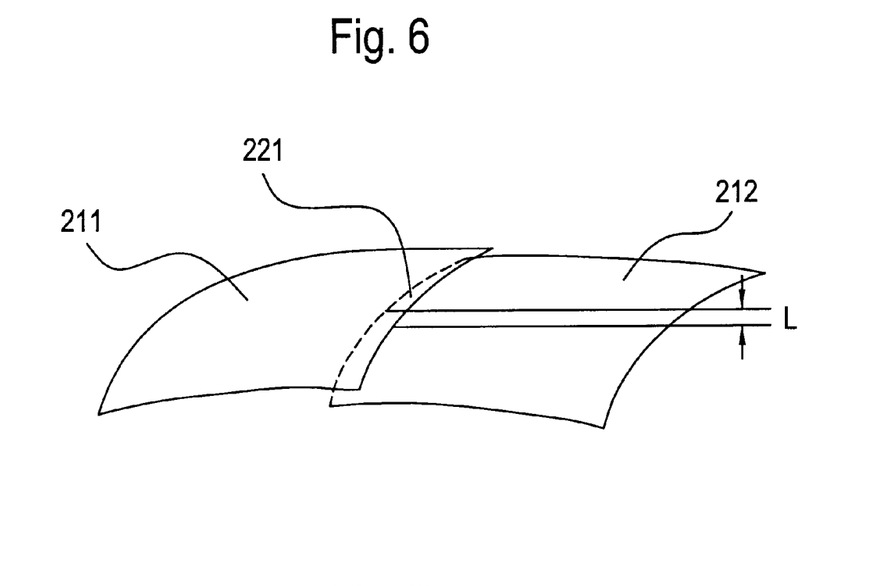
FIG. 6 is a view for describing a joint between measured data on adjacent surface shapes, which is done by the shape measuring method according to the first embodiment of the present invention.

As a result of twenty repetitions of the above-described simulation, the accuracy obtained in the present embodiment per one joining of measured data on adjacent surface shapes to each other, which is indicative of a difference in level or offset L shown in FIG. 6, was 0.007 μm and the accuracy of measurement of the entire shape was 0.12 μm. On the other hand, a comparative example using the conventional shape measuring method for simultaneously effecting fitting in plural directions will be explained. In this case, the accuracy per one joining of measured data on adjacent surface shapes to each other will result in 2.7 μm. Further, the accuracy of positioning in the translational direction, which is determined by the directly-advanced stage 14 and the rotatable stage 14', is 0.3 μm. Therefore, even if the accuracy of stage is used for the measured data on the adjacent partial surface shapes through the use of the method proposed by Japanese Published Unexamined Patent Application No. 8-27073, an accuracy of 0.3 μm would be obtained even in the case of one joining. It is thus understood from this point that according to the shape measuring method showing the present embodiment, the accuracy of measurement can be greatly improved. In the present embodiment, the fitting calculation has been performed with the surface to be measured as the toric shape. However, if the surface to be measured is identical in size to that employed in the present embodiment, then the number of times that the measured data on the surface shapes of the partial regions are joined together to each other, is substantially the same, and the accuracy per joining according to the present embodiment is substantially the same. Therefore, the substantially same accuracy of measurement can be obtained in any aspherical shapes.

Figure 7:
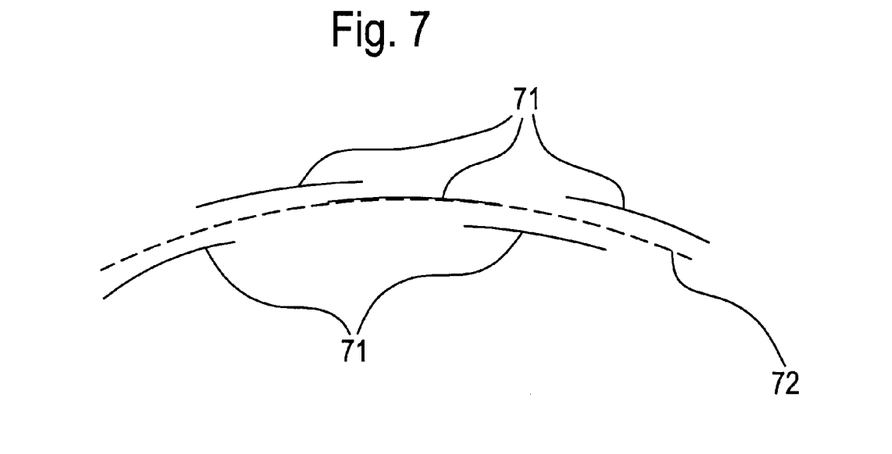
FIG. 7 is a cross-sectional view showing irregularities developed in the result of measurements made on the entire shape by a conventional shape measuring method for comparison.
Figure 8:
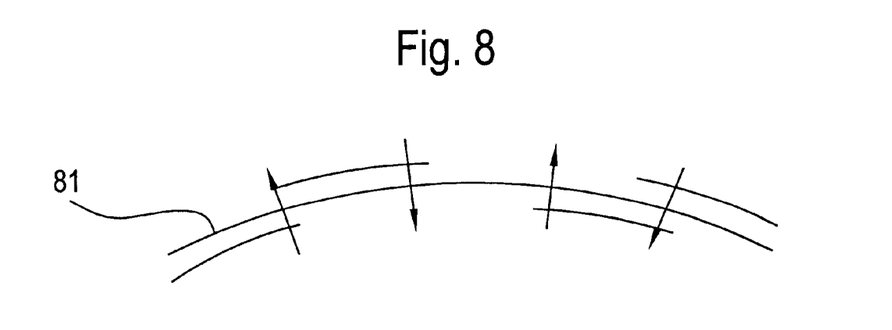
FIG. 8 is a cross-sectional view illustrating the result of measurements made on the entire shape, which has been obtained by fitting in accordance with the shape measuring method according to the first embodiment of the present invention.

As a result of the measurement made on the entire shape, which is obtained in accordance with the conventional method, the measured data on the surface shapes of the partial regions will create irregularities impossible to occur in the original surface shapes as indicated by a cross section in FIG. 7. According to the shape measuring method showing the present embodiment, the irregularities are removed by fitting as indicated by arrows in FIG. 8, whereby a measured result 81 high in accuracy, which is indicated by a thick line in the drawing, can be obtained.

Figure 9:
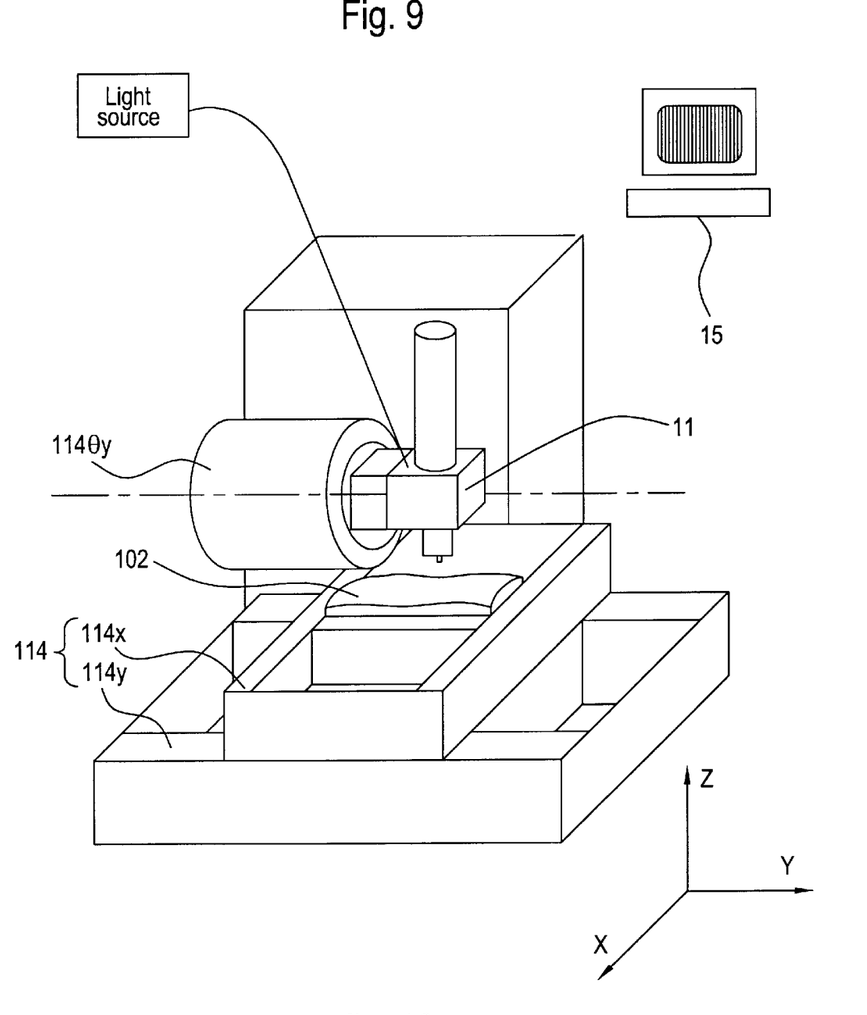
FIG. 9 is a view schematically depicting the structure of an apparatus used for a shape measuring method according to a second embodiment of the present invention.

A method of and an apparatus for measuring a shape, according to a second embodiment of the present invention will next be explained with reference to FIGS. 9 through 11. The shape measuring method according to the present embodiment has a feature in that measured data on the other surface shape is fitted to measured data on one surface shape sharing the use of an overlapped region only in the normal average direction by taking advantage of the fact that if the normal directions of all the portions of a surface to be measured are represented as shapes much undeviated from the normal average direction indicative of the average of these, then the normal directions of regions that overlap in the respective partial regions are substantially identical to a normal average direction of the measuring surface, whereby the accuracy of fitting over all the overlapped regions is enhanced.

A schematic structure of the apparatus used in the shape measuring method according to the present embodiment will next be explained with reference to FIG. 9. The present shape measuring apparatus has a directly-advanced stage 114 movable in XY translational two directions comprising an X-axis stage 114x movable in an X-axis direction and a Y-axis stage 114y movable in a Y-axis direction, and a rotatable stage 114θy rotatable with the Y axis as the center.

A white interferometer 11 using a plane prototype as a partial surface measuring means is attached to a rotatable shaft of the rotatable stage 114θy. On the other hand, an object 102 to be measured corresponding to an aspherical lens is placed on the X-axis stage 114x of the directly-advanced stage 114 and positioned so that a measuring surface 113 be opposed to the white interferometer 11.

Positional attitudes of the white interferometer 11 and the measuring surface 113 are determined by the directly-advanced stage 114 and the rotatable stage 114θy. The directly-advanced stage 114 moves a lens 112 in the translational two directions of the X and Y axes so as to allow the optical axis of the white interferometer 11 to substantially coincide with the normal direction of the measuring surface 113 corresponding to a free-shape surface. The rotatable stage 114θy rotates the white interferometer 11 with the Y axis as the center so as to control the orientation of the white interferometer 11.

A control device 15 is used for controlling the directly-advanced stage 114, the rotatable stage 114θy and the white interferometer 11 and joining results of measurements made on respective partial regions of the measuring surface 113 to each other to thereby calculate the entire shape.

Figure 10:
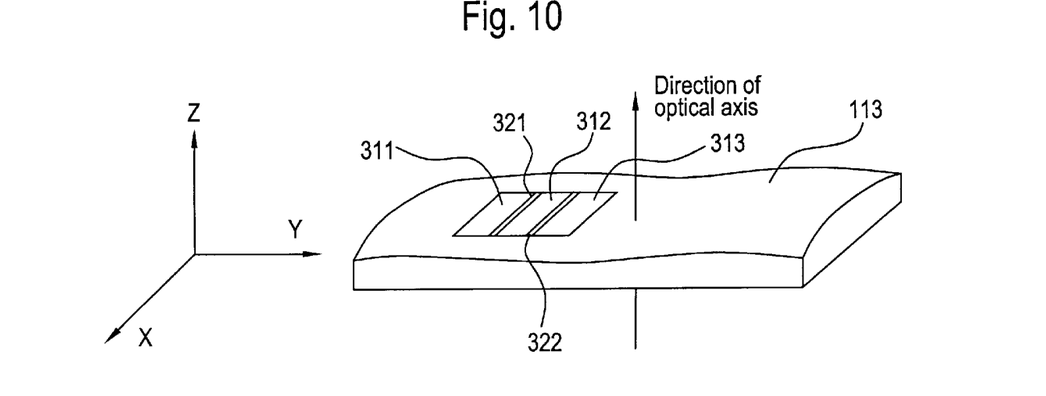
FIG. 10 is a view for describing an object to be measured employed in the second embodiment of the present invention.
Figure 11:
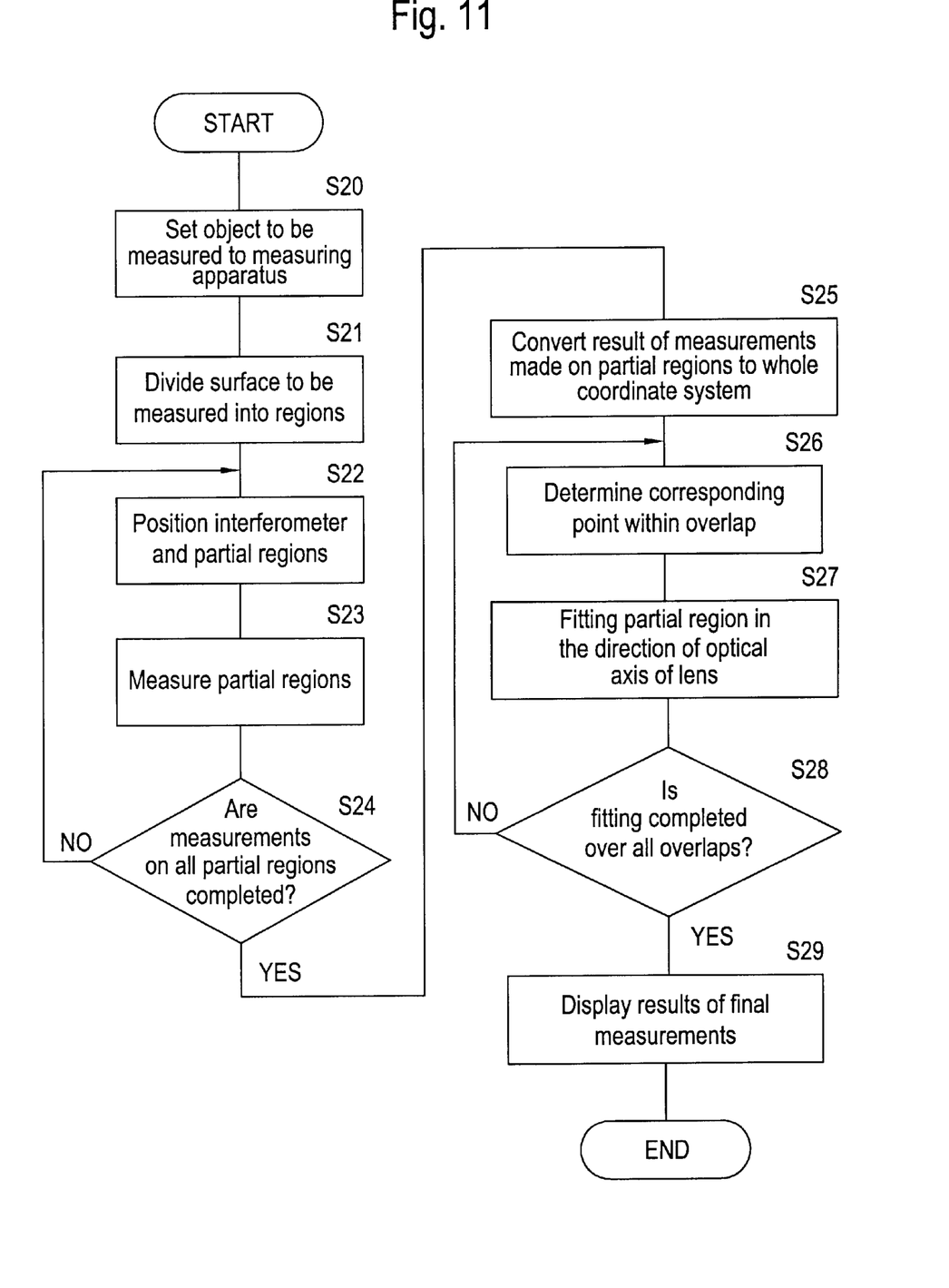
FIG. 11 is a flowchart for describing the shape measuring method according to the second embodiment of the present invention.

FIG. 10 is a perspective view showing the measuring surface 113 placed on the X-axis stage 114x and shows a state in which the surface 113 to be measured has been divided into a plurality of partial regions. Partial regions 311, 312, and 313 capable of being measured by the white interferometer 11 and overlapped regions 321 and 322 developed between the respective partial regions are shown in FIG. 10. In the surface 113 to be measured, its entire surface is actually covered with the partial regions measurable by the white interferometer 11 but omitted in FIG. 10. A representative portion is illustrated in FIG. 10. As shown in FIG. 10, a lens 102 indicative of an object to be measured employed in the present embodiment has the gentle measuring surface 113 reduced in difference of elevation or vertical interval with respect to the Y direction corresponding to the lengthwise direction of the lens 102. Thus, since the surface 113 to be measured has the gentle surface reduced in vertical interval with respect to the Y direction in the present embodiment, the directly-advanced/rotatable stages of the shape measuring apparatus may have only two translational axes and one rotational axis respectively to determine positional attitudes so that the partial regions 311, 312, and 313 can be measured by the white interferometer 11.

The flow of the shape measuring method according to the present embodiment will be explained using a flowchart shown in FIG. 11. The object 102 to be measured is first set to the shape measuring apparatus (Step S20). Next, the surface 113 to be measured is divided into partial regions capable of being measured by the white interferometer 11 and provided so as to include regions that overlap each other (Step S21). Using the directly-advanced stage 114 (X-axis stage 114x and Y-axis stage 114y) and the rotatable stage 114θy, positional attitudes of the white interferometer 11 and the partial region 311 are determined so that the partial region 311 to be first measured can be measured by the white interferometer 11 (Step S22). In this state, a surface shape of the partial region 311 is measured by the white interferometer 11, and shape data on the partial region 311 and data on the positional attitude of the white interferometer 11 are recorded (Step S23). Next, the directly-advanced stage 114 and the rotatable stage 114θy are used to determine positional attitudes of the white interferometer 11 and the partial region 312 so that the partial region 312 adjacent to the partial region 311 can be measured by the white interferometer 11. Subsequently, the same measurements as described above are repeated (Step S24).

After the above-described measurements on all the partial regions on the surface 113 to be measured have been completed, the entire shape of the surface 113 to be measured is calculated in accordance with the following method. First of all, measured data on surface shapes of all the partial regions are converted into a whole coordinate system corresponding to a common coordinate system, based on the positional attitude data on the white interferometer 11 and the partial regions, which are obtained by an encoder or a length measuring machine or the like attached to the stage. Thus, the measured data on the surface shapes of the respective partial regions are substantially joined to each other (Step S25). Next, a point where a straight line drawn in parallel to the direction of the optical axis of the lens from each of a plurality of points on the partial region 312, which are measured by the white interferometer 11 intersects the partial region 311, is determined by interpolation from a point on the partial region 311 measured by the white interferometer 11, whereby a point where the partial region 311 corresponds to the partial region 312, is determined (Step S26). Fitting is performed on the partial region 312 only in the direction of the optical axis of the lens (i.e., in the direction indicated by arrow in FIG. 10) so that the distances between the partial region 312 and all corresponding points of the partial region 311 are minimized as the whole of the overlapped region 321 to thereby correct information on the position of the partial region 312 (Step S27). This calculation is performed on all the adjacent partial regions (Step S28) to obtain data on the entire shape of the surface 113 to be measured (Step S29).

In the present embodiment, the normal directions of all the parts on the surface to be measured are not greatly deviated from the normal average direction (i.e., the direction of the optical axis of the lens in this case) indicative of their average because the surface to be measured is gentle. Therefore, even if the fitting is effected on all the parts in the direction of the optical axis of the lens, the accuracy of fitting substantially similar to that obtained when the fitting is done in the direction of the normal to the surface of each overlapped region, can be obtained. This method has an advantage in that since it is unnecessary to calculate the directions of the normal to the surfaces of the respective overlapped regions, calculation processing becomes easy. Further, the normal average direction of the surface to be measured is set to the Z direction corresponding to the direction normal to the translational direction movable on the directly-advanced stage in the present embodiment. Thus, the present embodiment has an advantage in that since data on stage positions in the orthogonal X and Y directions are utilized as they are and data on a stage position in the Z direction alone is corrected by fitting, calculation processing becomes easy. Similarly, when the stages movable in the XYZ directions are used as in the first embodiment, the calculation processing can be facilitated by matching the normal average direction with the Z direction, for example.

The present invention is not necessarily limited to the above-described embodiments various modifications can be made thereto.

According to the shape measuring method employed in the above-described embodiment, for example, if the partial surface measuring means of the shape measuring apparatus has accuracy higher than that of the directly-advanced stage used as moving means, then the accuracy can be enhanced by making joining using the overlapped regions. Therefore, an interferometer using a normal spherical prototype may be utilized in addition to the white interferometer using the plane prototype employed in the above-described embodiment. Further, a hologram prototype excellent in accuracy may be used if possible.

A description has been made of the directly-advanced stage 14 and the rotatable stage 14' employed in the first embodiment, which are constructed so as to move the measuring object and the white interferometer 11 in the translational direction and in the direction of rotation respectively. However, if the interferometer can determine its positional attitude so as to be able to measure the partial regions on the surface to be measured, then the multiaxial stage 14 may adopt any configuration. Thus, the number of axes of stages can be reduced according to the shape of the surface to be measured as in the second embodiment.

According to the present invention as has been described above, even when a surface to be measured has a shape much different from that of a spherical surface, high-accuracy fitting can be done by using a narrow overlapped region developed between small partial regions measurable by an interferometer using the spherical or plane prototype. Accordingly, the whole shape can be obtained with high accuracy by dividing a complex free-shape surface into a plurality of partial regions measurable by the interferometer and joining measured data on surface shapes measured for the respective partial regions to each other.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as they fall within the true scope of the invention.

What is claimed is:

1. A method of measuring shapes, comprising the steps of:

dividing a surface to be measured having a three-dimensional shape into a plurality of partial regions having mutually overlapped regions;

measuring surface shapes and relative positional attitudes of said plurality of partial regions;

roughly joining measured data on the surface shapes of said plurality of partial regions to one another, based on said relative positional attitudes;

fitting the measured data on said surface shape of a second of said partial regions to the measured data on the surface shape of a first of said partial regions in said overlapped regions only in a direction normal to the surface of each said overlapped region; and joining adjacent said partial regions to one another to thereby measure an entire three-dimensional shape of the surface to be measured.

2. A method of measuring shapes, comprising the steps of:

dividing a surface to be measured having a three-dimensional shape into a plurality of partial regions having mutually overlapped regions;

measuring surface shapes and relative positional attitudes of said plurality of partial regions;

roughly joining measured data on the surface shapes of said plurality of partial regions to one another, based on said relative positional attitudes;

fitting the measured data on said surface shape of a second of said partial regions to the measured data on the surface shape of a first of said partial regions in said overlapped regions only in a normal average direction indicative of an average of normal directions of said plurality of partial regions on the surface to be measured; and joining adjacent said partial regions to one another to thereby measure an entire three-dimensional shape of the surface to be measured.

3. A method according to claim 2, wherein said surface to be measured is measured by using a multiaxial stage and is set prior to the step for measuring the surface shapes and the relative positional attitudes so that the average direction of the normal to said measuring surface coincides with one of a translational direction of each axis of said multiaxial stage and a direction normal to the said translational direction.

4. A shape measuring apparatus comprising:

partial surface measuring means for dividing a surface to be measured having a three-dimensional shape into a plurality of partial regions having mutually overlapped regions and measuring surface shapes of said plurality of partial regions;

moving means for respectively determining positional attitudes of said partial regions and said partial surface measuring means; and measurement control means for roughly joining measured data on the surface shapes of said partial regions to one another, based on said positional attitudes, and thereafter fitting the measured data on the surface shape of a second of said partial regions to the measured data on the surface shape of a first of said partial regions in said overlapped regions only in the direction of a substantial normal to the surface of each said overlapped region so as to join adjacent said partial regions to one another to thereby measure an entire three-dimensional shape of the surface to be measured.

5. A shape measuring apparatus according to claim 4, wherein said moving means are respectively movable/rotatable in at least two translational directions orthogonal to each other and one direction of rotation.

6. A shape measuring apparatus according to claim 4, wherein said partial surface measuring means is a surface measuring device having a measurement accuracy higher than a positioning accuracy of each said moving means.

7. A shape measuring apparatus according to claim 4, wherein said partial surface measuring means is a surface measuring device using optical interference.

8. A shape measuring apparatus comprising:

partial surface measuring means for dividing a surface to be measured having a three-dimensional shape into a plurality of partial regions having mutually overlapped regions and measuring surface shapes of said plurality of partial regions;

moving means for respectively determining positional attitudes of said partial regions and said partial surface measuring means; and measurement control means for roughly joining measured data on the surface shapes of said partial regions to one another, based on said positional attitudes, and thereafter fitting the measured data on the surface shape of a second of said partial regions to the measured data on the surface shape of a first of siad partial regions in said overlapped regions only in a normal average direction indicative of an average of normal directions of said plurality of partial regions on the surface to be measured, so as to join adjacent said partial regions to one another to thereby measure an entire three-dimensional shape of the surface to be measured.

9. A shape measuring apparatus according to claim 8, wherein said moving means comprise a multiaxial stage and the measurement of said surface shape is started after the surface to be measured has been set so that the average direction of the normal to said measuring surface coincides with one of a translational direction of each axis of said multiaxial stage and a direction normal to the said translational direction.

10. A shape measuring apparatus according to claim 8, wherein said moving means are respectively movable/rotatable in at least two translational directions orthogonal to each other and one direction of rotation.

11. A shape measuring apparatus according to claim 8, wherein said partial surface measuring means is a surface measuring device having a measurement accuracy higher than a positioning accuracy of each said moving means.

12. A shape measuring apparatus according to claim 8, wherein said partial surface measuring means is a surface measuring device using optical interference.

* * * * *